(12) United States Patent
Dong

(10) Patent No.: US 11,183,854 B1
(45) Date of Patent: Nov. 23, 2021

(54) RECHARGING OF BACKUP BATTERY UNITS USING INTERMITTENT CHARGING CYCLES

(71) Applicant: Amazon Technologies, Inc., Seattle, WA (US)

(72) Inventor: Yi Dong, Bellevue, WA (US)

(73) Assignee: Amazon Technologies, Inc., Seattle, WA (US)

( * ) Notice: Subject to any disclaimer, the term of this patent is extended or adjusted under 35 U.S.C. 154(b) by 112 days.

(21) Appl. No.: 16/417,230

(22) Filed: May 20, 2019

(51) Int. Cl.
*H02J 9/06* (2006.01)
*H02J 7/00* (2006.01)

(52) U.S. Cl.
CPC .......... *H02J 7/0013* (2013.01); *H02J 9/061* (2013.01); *H02J 9/068* (2020.01)

(58) Field of Classification Search
CPC ........... H02J 7/0013; H02J 9/061; H02J 9/068
See application file for complete search history.

(56) References Cited

U.S. PATENT DOCUMENTS

| | | | | |
|---|---|---|---|---|
| 5,160,851 A | * | 11/1992 | McAndrews | H02J 9/061 307/66 |
| 6,476,583 B2 | * | 11/2002 | McAndrews | H02J 7/0013 320/119 |
| 10,725,514 B1 | * | 7/2020 | Wang | G06F 1/263 |

* cited by examiner

*Primary Examiner* — Dinh T Le
(74) *Attorney, Agent, or Firm* — Kilpatrick Townsend & Stockton LLP

(57) ABSTRACT

Recharging of battery backup units in a power supply system employs sequences of charging cycles segments and non-charging segments to reduce the additional power draw induced by recharging of the battery backup units. A method of operating a power supply system includes independently controlling recharging of battery backup units by using respective sequences first BBU charging segments and first BBU non-charging segments so that at least one of the charging segments for one of the battery backup units overlaps one of the non-charging segments of another of the battery backup units.

12 Claims, 8 Drawing Sheets

US 11,183,854 B1

RECHARGING OF BACKUP BATTERY UNITS USING INTERMITTENT CHARGING CYCLES

BACKGROUND

Many critical electrically powered systems include battery backup units that provide backup power in the event of a utility power outage. Upon restoration of utility power or after testing, the battery backup units are typically recharged to be ready for the next utility power outage.

BRIEF DESCRIPTION OF THE DRAWINGS

Various embodiments in accordance with the present disclosure will be described with reference to the drawings, in which.

DETAILED DESCRIPTION

Power supply systems that include battery backup units, and methods of operating a power supply systems that includes battery backup units, employ different sequences of intermittent charging cycles during recharging of the battery backup units so as to reduce total combined power draw on a power source following the end of a power outage. In many embodiments, each respective intermittent charging cycle includes a charging segment during which a respective one of the battery backup units is charged and a non-charging segment during which the battery backup unit is not recharged. The different sequences of intermittent charging cycles are configured so that at least one of the respective charging segments for one of the battery backup units overlaps one of the respective non-charging segments of another of the battery backup units, thereby tending to decrease the total number of battery backup units that are recharged at any particular point in time so as to decrease the total power draw on the power source following the end of a power outage. The approaches and systems described herein can be used in any suitable application, but may be particularly well suited for use in a data center.

Figure 1:
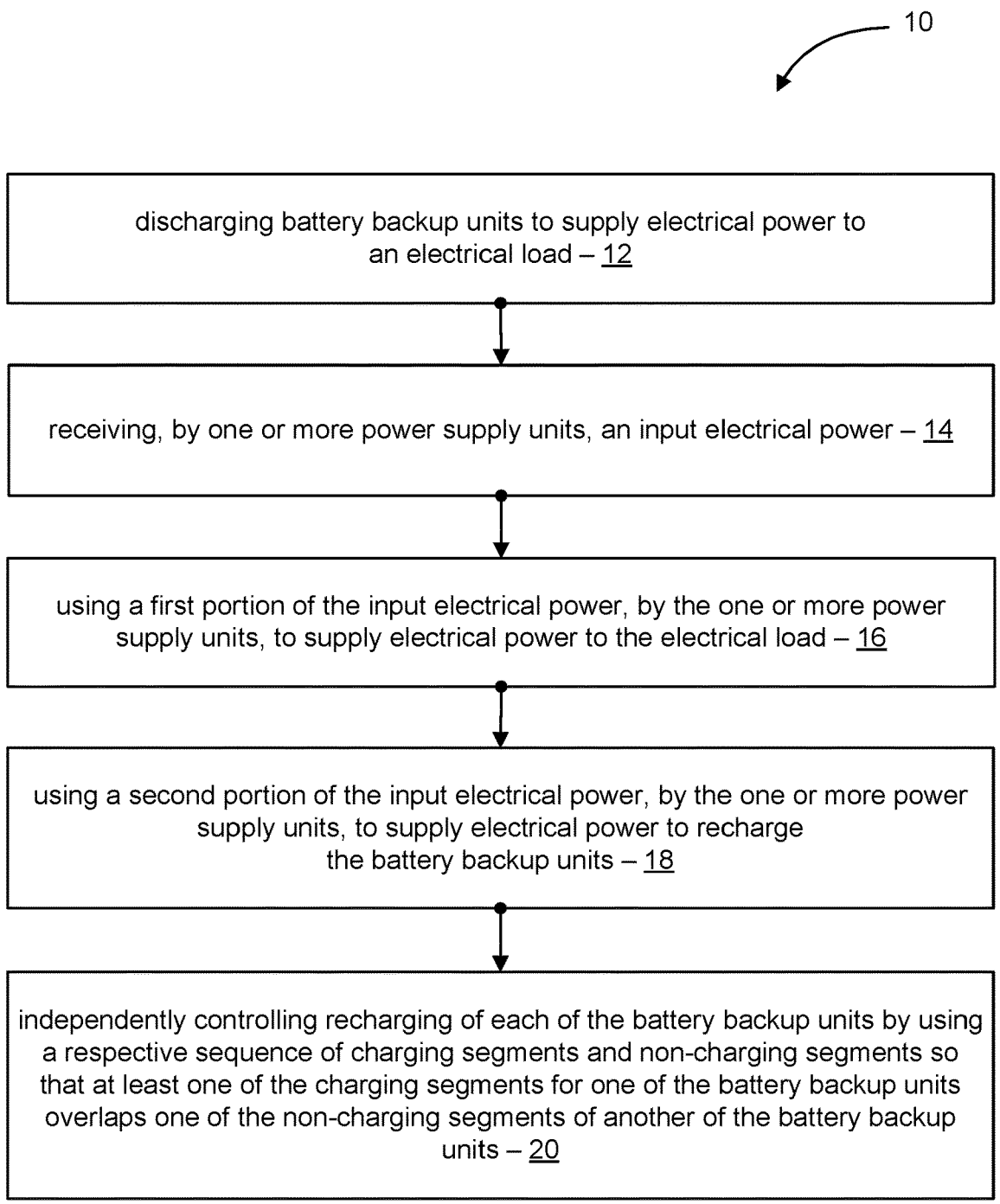
FIG. 1 is a simplified schematic diagram of a method of operating a power supply system that includes battery backup units, in accordance with some embodiments.

In the description herein, various embodiments are described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described. Techniques described herein include approaches for controlling recharging of battery backup units in a power supply system to reduce total power demand on a primary power source or secondary power source following restoration of power after a power outage. For example, turning now to the drawing figures in which the same or similar reference identifiers designate the same or similar elements, FIG. 1 is simplified schematic diagram of a method 10 of operating a power supply system that includes battery backup units, in accordance with various embodiments.

The method 10 includes discharging battery backup units to supply electrical power to one or more electrical loads (act 12). For example, act 12 can be accomplished during a power outage to avoid loss of power supply to the one or more electrical loads. In many embodiments, the battery backup units are operatively connected with one or more power supply units that supply electrical power to the one or more electrical loads. In many embodiments, each of the one or more power supply units is connected to a main power source (e.g., a utility or a power generation system that supplies alternating current (AC) electrical power, an automatic transfer switch that receives electrical power from either a primary power source or a secondary power source) to receive electrical power that the power supply unit uses to supply electrical power to the one or more electrical loads. In many embodiments, each of the one or more power supply units is also connected to one or more of the battery backup units to receive electrical power from the battery backup unit(s) when power is not supplied by the main power source so as to continue to supply electrical power to one or more electrical loads using the electrical power received from the battery backup unit(s).

The method 10 further includes receiving, by one or more power supply units, an input electrical power (act 14). For example, act 14 can be accomplished following the end of a power outage via recommencement of supply of electrical power to the one or more power supply units by the main power source.

Upon restoration of supply of electrical power to the one or more power supply units by the main power source, the electrical power supplied by the main power source can be used by the one or more power supply units to supply electrical power to one or more electrical loads and recharge the battery backup units. For example, method 10 further includes: (a) using a first portion of the input electrical power, by the one or more power supply units, to supply electrical power to one or more electrical loads (act 16); and (b) using a second portion of the input electrical power, by the one or more power supply units, to supply electrical power to recharge the battery backup units (act 18).

The method 10 can be used to reduce total power demand on the main power source following restoration of power after a power outage. In this regard, act 20 includes independently controlling recharging of each of the battery backup units by using a respective sequence of intermittent charging cycles. Each of the intermittent charging cycles includes a respective charging segment during which the respective battery backup unit is recharged and a respective non-charging segment during which the respective battery backup unit is not recharged. At least one of the respective charging segments for one of the battery backup units overlaps one of the respective non-charging segments of another of the battery backup units.

Figure 2:
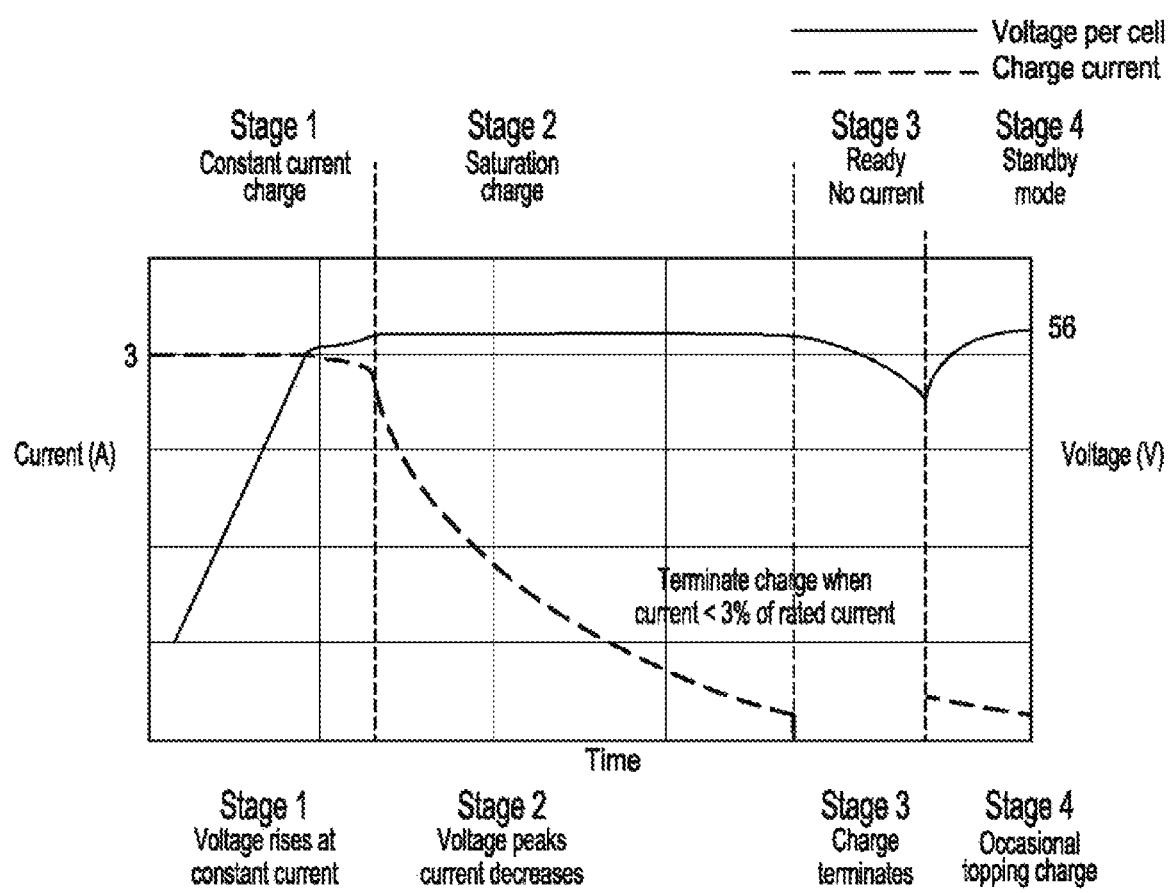
FIG. 2 is a graph showing a representative variation in charging current over time during recharging of a battery backup unit.

Recharging of battery backup units following a power outage adds an additional power drain on the main power source. FIG. 2 is a graph showing a representative variation in charging current over time for a non-intermittent recharging instance of a discharged battery backup unit. During a first segment (Stage 1) of the non-intermittent recharging instance, the charging current is limited to a suitable maximum recharging current (e.g., 3 amperes) while the battery backup unit voltages rises up to a suitable target voltage (e.g., 56 volts). During a second segment (Stage 2) of the non-intermittent recharging instance, the battery voltage is limited to the target voltage and the recharging current decreases down to a suitable charge termination current (e.g., less than 3% of rated current for the battery backup unit). Accordingly, recharging battery backup units imposes an additional power draw that is maximized during the first segment (Stage 1) of the non-intermittent recharging instance, and reduces therefrom during the second segment (Stage 2). By employing respective sequences of intermittent charging cycles, the method 10 reduces the additional power draw in comparison to when all the battery backup units are simultaneously recharged using non-intermittent charging.

In some embodiments of the method 10, the power supply system that includes battery backup units can include one or more automatic transfer switches that automatically switch between transmitting power to the one or more power supply units from a primary power source and a secondary power source. For example, the method 10 can further include: (a) supplying, by one or more automatic transfer switches, AC power to the one or more power supply units by using AC power received by the one or more automatic transfer switches from a primary AC power source; and (b) supplying, by one or more automatic transfer switches, AC power to the one or more power supply units by using AC power received by the one or more automatic transfer switches from a secondary AC power source different from the primary AC power source.

In some embodiments of the method 10, the recharging of each of the battery backup units is controlled via a respective charging control signal transmitted to the respective battery backup unit. For example, the method 10 can include transmitting a respective charging control signal to each of the battery backup units. Each of the respective charging control signals can include an alternating sequence of a charging enable signal and a charging disable signal. The charging enable signal can cause the respective battery backup unit (BBU) to recharge during each of the respective charging segments. The charging disable signal can cause the respective BBU to not recharge during each of the respective non-charging segments. Each respective charging control signal can be independently configured to employ varying times spans for the charging segments and the non-charging segments so as to make it statistically probable that the combination of two or more of such charging signals results in overlap between a charging segment for one BBU to and a non-charging segment for another BBU. For example, the varying time spans can be randomly selected for each respective charging control signal, thereby tending to increase the statistical probability that a charging segment for one BBU overlaps a non-charging segment for another BBU without having to coordinate the generation of the charging control signals. In further embodiments, a control unit can coordinate the different charging control signals that are sent to the BBUs to cause a desired number of BBUs to be charging or not charging at any given time.

Figure 3:
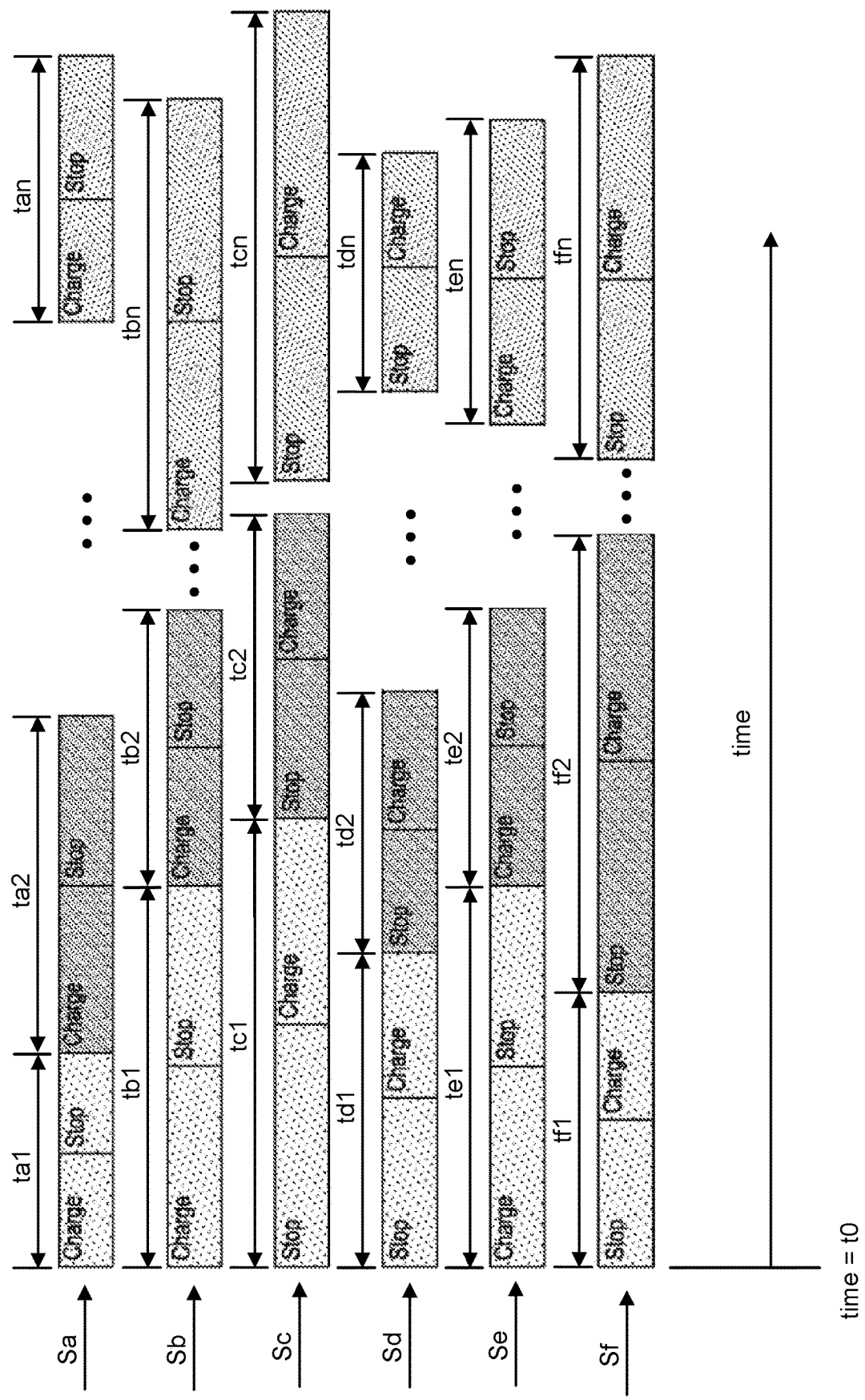
FIG. 3 is a schematic diagram showing example sequences of intermittent charging cycles that can be used to recharge battery backup units, in accordance with various embodiments.

In many embodiments of the method 10, the respective sequences of intermittent charging cycles include variations that reduce the total number of the battery backup units that are being recharged at any particular point in time. For example, FIG. 3 is a schematic diagram showing example sequences (Sa, Sb, Sc, Sd, Se, Sf) of intermittent charging cycles that can be used to recharge a group of six battery backup units, in accordance with some embodiments. Each of the sequences (Sa, Sb, Sc, Sd, Se, Sf) start at the same time (t0), which can be when utility power is restored, or a suitable time after the restoration of utility power. Each of the example respective sequences (Sa, Sb, Sc, Sd, Se, Sf) has a sequence of respective charging cycle time spans (ta1, ta2 through tan), (tb1, tb2 through tbn), (tc1, tc2 through tcn), (td1, td2 through tdn), (te1, te2 through ten), (tf1, tf2 through tfn), that vary over the respective sequence of intermittent charging cycles. Each of the respective charging cycle time spans corresponds to a combination of an associated one of the charging segments and an associated one of the non-charging segments. In some embodiments of the method 10, each of the respective sequences of intermittent charging cycles employs charging cycle time spans that are preselected from a set of suitable time spans. For example, each of the sequences (Sa, Sb, Sc, Sd, Se, Sf) employs charging cycle time spans that were preselected from a set of suitable time spans. In some other embodiments of the method 10, each of the respective sequences of intermittent charging cycles employs charging cycle time spans that are randomly selected from a set of suitable time spans. Additionally each of sequences (Sa, Sb, and Se) employ a first charging order in which the initial segment is a charging segment and each charging segment is followed by an associated non-charging segment. In contrast, each of sequences (Sc, Sd, and Sf) employ a second charging order in which the initial segment is a non-charging segment and each non-charging segment is followed by an associated charging segment. As illustrated for the sequences (Sa, Sb, Sc, Sd, Se, Sf), as result of the variation in the charging cycle time spans employed, coupled with the use of two different charging orders, there is always at least one of the battery backup units that is not being charged at any particular point in time, and there are often two or more of the battery backup units that are not being charged at any particular point in time.

Figure 4:
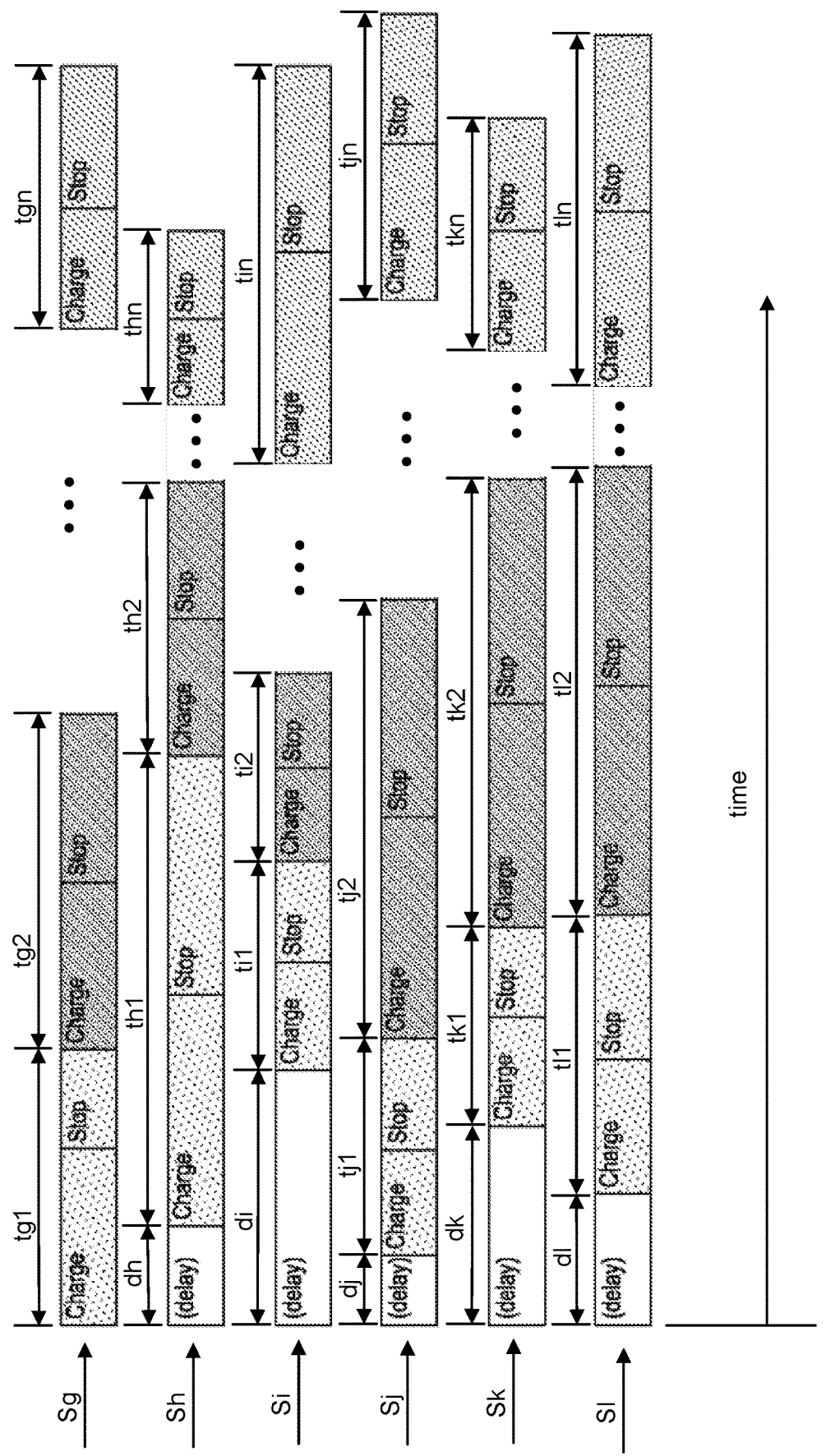
FIG. 4 is a schematic diagram illustrating example variation in a delay before starting respective sequences of intermittent charging cycles that can be used to recharge battery backup units, in accordance with various embodiments.

In some embodiments of the method 10, at least one of the respective sequences of intermittent charging cycles begins at an arbitrary non-zero time period from when electrical power begins to be supplied to the one or more power supply units. For example, FIG. 4 is a schematic diagram illustrating example variation in a delay (dh, di, dj, dk, dl) before starting respective sequences (Sg, Sh, Si, Sj, Sk, Sl) of intermittent charging cycles that can be used to recharge a set of six battery backup units, in accordance with various embodiments. Each of the example respective sequences (Sg, Sh, Si, Sj, Sk, Sl) has a sequence of respective charging cycle time spans (tg1, tg2 through tgn), (th1, th2 through thn), (ti1, ti2 through tin), (tj1, tj2 through tjn), (tk1, tk2 through tkn), (tl1, tl2 through tln), that vary over the respective sequence of intermittent charging cycles. Each of the respective charging cycle time spans corresponds to a combination of an associated one of the charging segments and an associated one of the non-charging segments. In some embodiments of the method 10, each of the respective sequences of intermittent charging cycles employs charging cycle time spans that are preselected from a set of suitable time spans. For example, each of the sequences (Sa, Sb, Sc, Sd, Se, Sf) employs respective sequences of intermittent charging cycles that were preselected from a set of suitable time spans. In some other embodiments of the method 10, each of the respective sequences of intermittent charging cycles employs charging cycle time spans that are randomly selected from a set of suitable time spans. As illustrated for the sequences (Sg, Sh, Si, Sj, Sk, Sl), the variation in the charging cycle time spans employed, coupled with the usage of a variable delay before starting respective sequences of intermittent charging cycles, serves to reduce the additional power draw induced by recharging of the battery backup units as compared to recharging all six of the battery backup units at the same time. Any suitable approach can be used to select the variable delay. For example, each of the delays can be preselected from a set of suitable delays, randomly selected from a set of suitable delays, or randomly selected from within a suitable range of delays.

Figure 5:
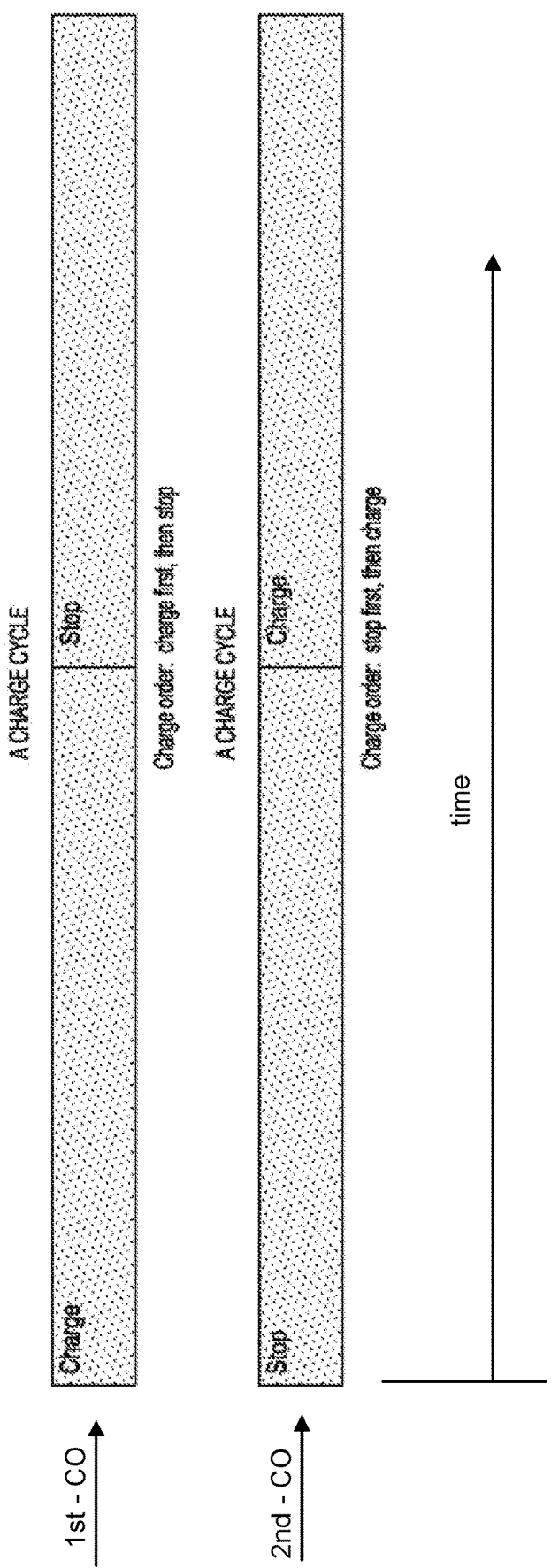
FIG. 5 is a schematic diagram illustrating variation in charging order that can be employed during recharging of battery backup units, in accordance with various embodiments.

In some embodiments of the method 10, the order of the charging segment and the non-charging segment in the sequences of intermittent changing cycles can be varied between the respective sequences. For example, FIG. 5 is a schematic diagram illustrating variation in charging order that can be employed during recharging of battery backup units, in accordance with various embodiments. Each of the respective sequence of intermittent charging cycles can employ either a first charge order (1st-CO) in which the charging segment precedes the associated non-charging segment or a second charge order (2nd-CO) in which the non-charging segment precedes the associated charging segment. At least one of the respective sequence of intermittent charging cycles can employ the first charge order. At least one of the respective sequence of intermittent charging cycles can employ the second charge order. In some embodiments of the method 10, the one or more control units randomly selects which of the first charge order and the second charge order to employ for recharging of at least one of the battery backup units.

Each respective charging segment can have a charging segment time that is based off a suitable duty cycle percentage. For example, each respective charging segment can have a charging segment time span that is equal to a duty cycle percentage of a time span of the intermittent charging cycle. Any suitable duty cycle percentage can be used. For example, in some embodiments, the duty cycle percentage is based on a magnitude of a charging current supplied to the respective BBU. For example, the duty cycle percentage can be a function of the charging current magnitude with the duty cycle percentage increasing as the charge current magnitude decreases.

Some or all of the method 10 (or any other methods described herein, or variations, and/or combinations thereof) may be performed under the control of one or more computer systems configured with executable instructions and may be implemented as code (e.g., executable instructions, one or more computer programs, or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

Figure 6:
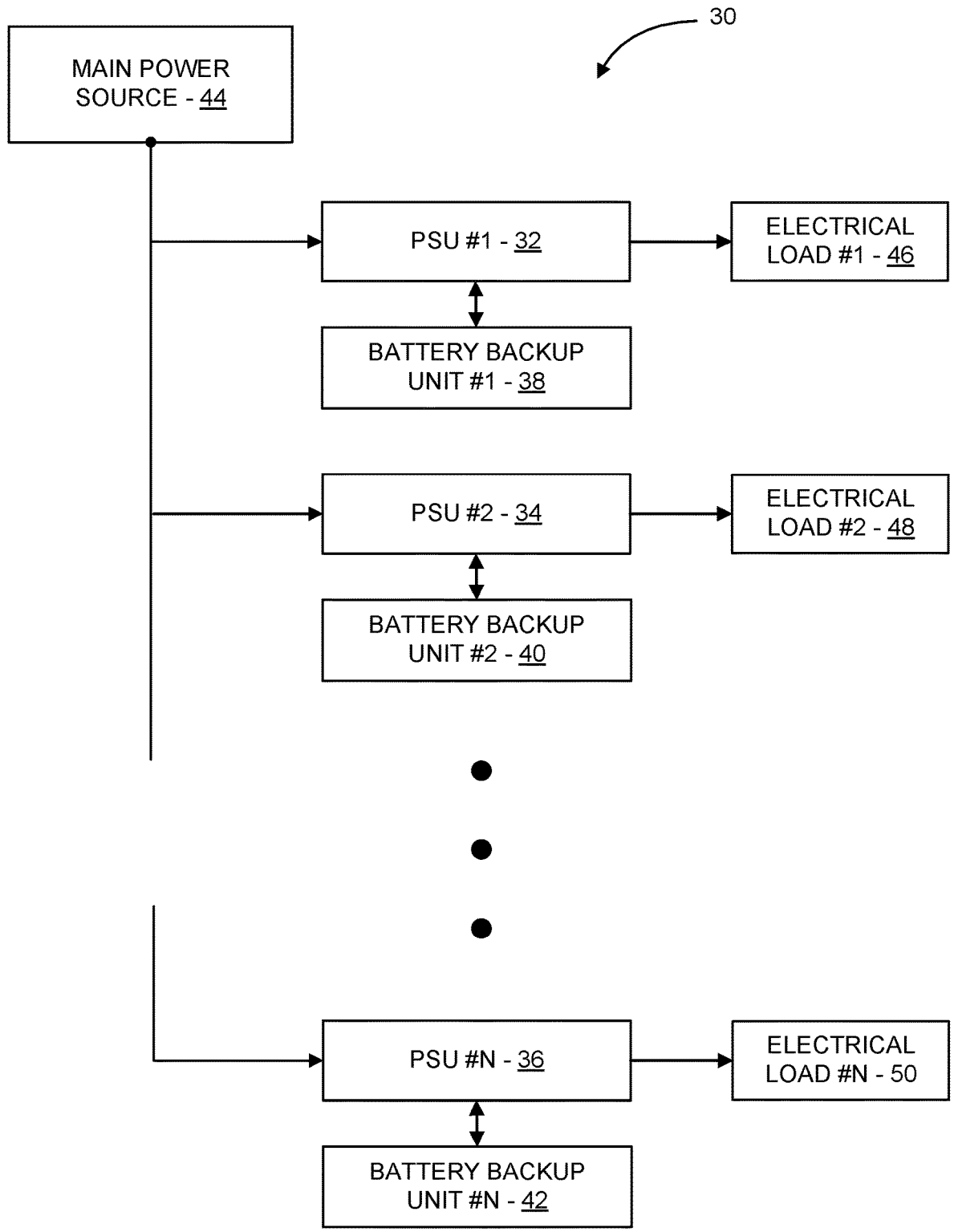
FIG. 6 is a simplified schematic representation of a power supply system, in accordance with various embodiments, that includes rechargeable battery backup units.

The method 10 can be practiced via any suitable power supply system. For example, FIG. 6 is a simplified schematic representation of a power supply system 30 that can be used to accomplish the method 10. The power supply system 30 includes a first power supply unit 32 and a second power supply unit 34 through an $n^{th}$ power supply unit 36. The power supply system 30 further includes a first battery backup unit 38 and a second battery backup unit 40 through an $n^{th}$ battery backup unit 42. Each of the power supply units 32, 34, 36 is connected to a main power source 44 to receive electrical power (e.g., alternating current (AC) power) from the main power source 44 when supplied electrical power by the main power source 44, and use the electrical power received from the main power source 44 to supply electric power to electrical loads 46, 48, 50. Each of the power supply units 32, 34, 36 is also connected to a respective one of the battery backup units 38, 40, 42 to receive electrical power from the battery backup unit when not supplied electrical power by the main power source 44, and use the electrical power received from the battery backup unit to supply electric power to electrical loads 46, 48, 50. Following the end of a power outage of the main power source 44 that results in a substantial discharging of the battery backup units 38, 40, 42, the power supply system 30 can employ the sequences of intermittent charging cycles of method 10 during recharging of the battery backup units 38, 40, 42 to reduce the additional power draw induced by recharging the battery backup units 38, 40, 42 as described herein. The power supply system 30 can be configured to implement the method 10 in any suitable manner. For example, in some embodiments, each of the power supply units 32, 34, 36 can be configured to independently control recharging of the respective battery backup unit 38, 40, 42 connected to the power supply unit using a respective sequence of intermittent charging cycles per the method 10. As another example, in some embodiments, each of the battery backup units 38, 40, 42 can be configured to independently control its own recharging using a respective sequence of intermittent charging cycles per the method 10.

Figure 7:
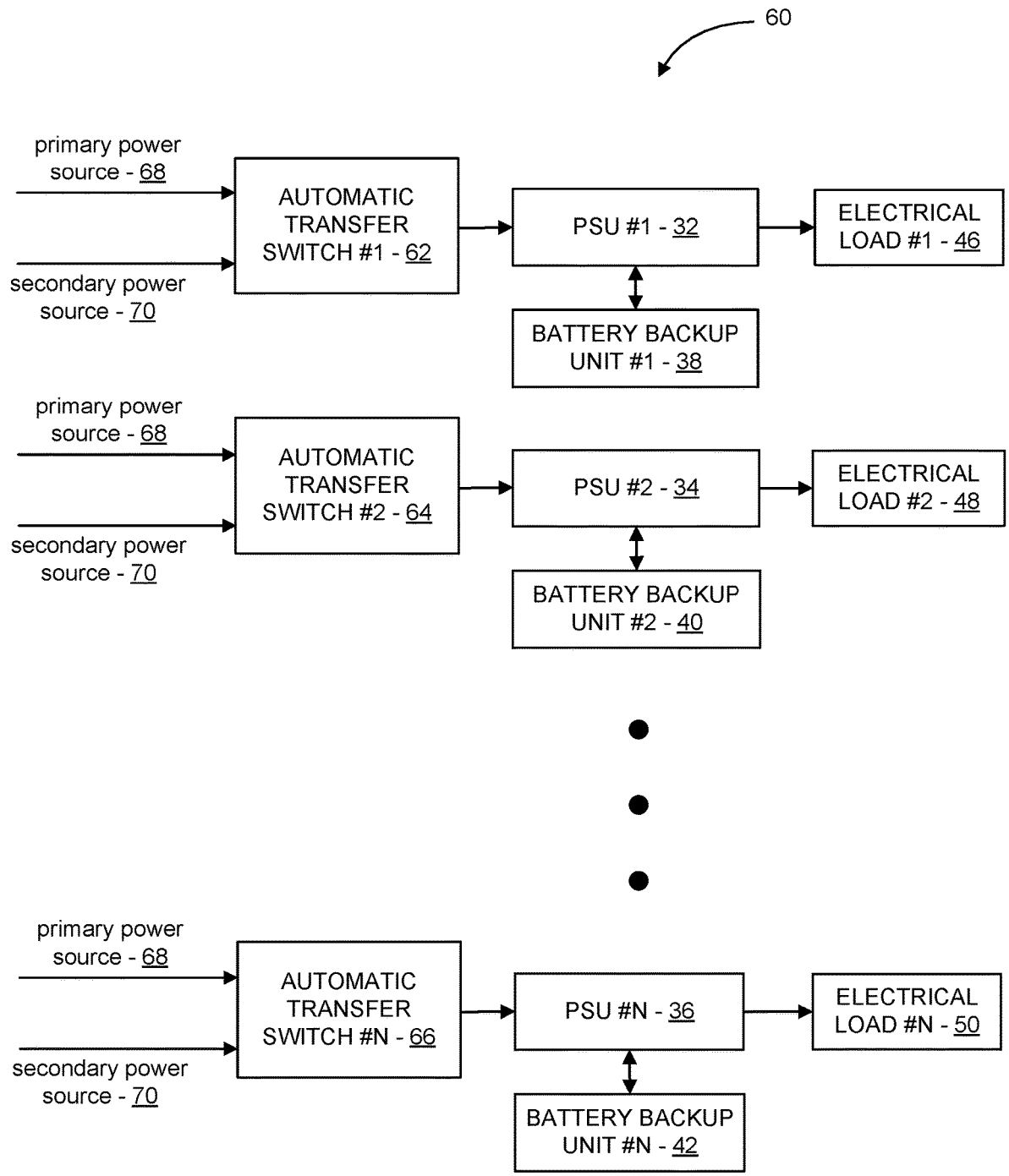
FIG. 7 is a simplified schematic representation of another power supply system, in accordance with various embodiments, that includes rechargeable battery backup units.

FIG. 7 is a simplified schematic representation of another power supply system 60 that can be used to accomplish the method 10. The power supply system 60 is configured the same as the power supply system 30, but further includes a first automatic transfer switch 62 and a second automatic transfer switch 64 through a $n^{th}$ automatic transfer switch 66. The automatic transfer switches 62, 64, 66 serve to switch between supplying power from a primary power source 68 and a secondary power source 70 based on availability of power supply by the primary power source 68 and the secondary power source 70 using known approaches. Following the end of a power outage of both the primary power source 68 and the secondary power source 70 that results in a substantial discharging of the battery backup units 38, 40, 42, the power supply system 60 can employ the sequences of intermittent charging cycles of method 10 during recharging of the battery backup units 38, 40, 42 to reduce the additional power draw induced by recharging the battery backup units 38, 40, 42 as described herein.

Figure 8:
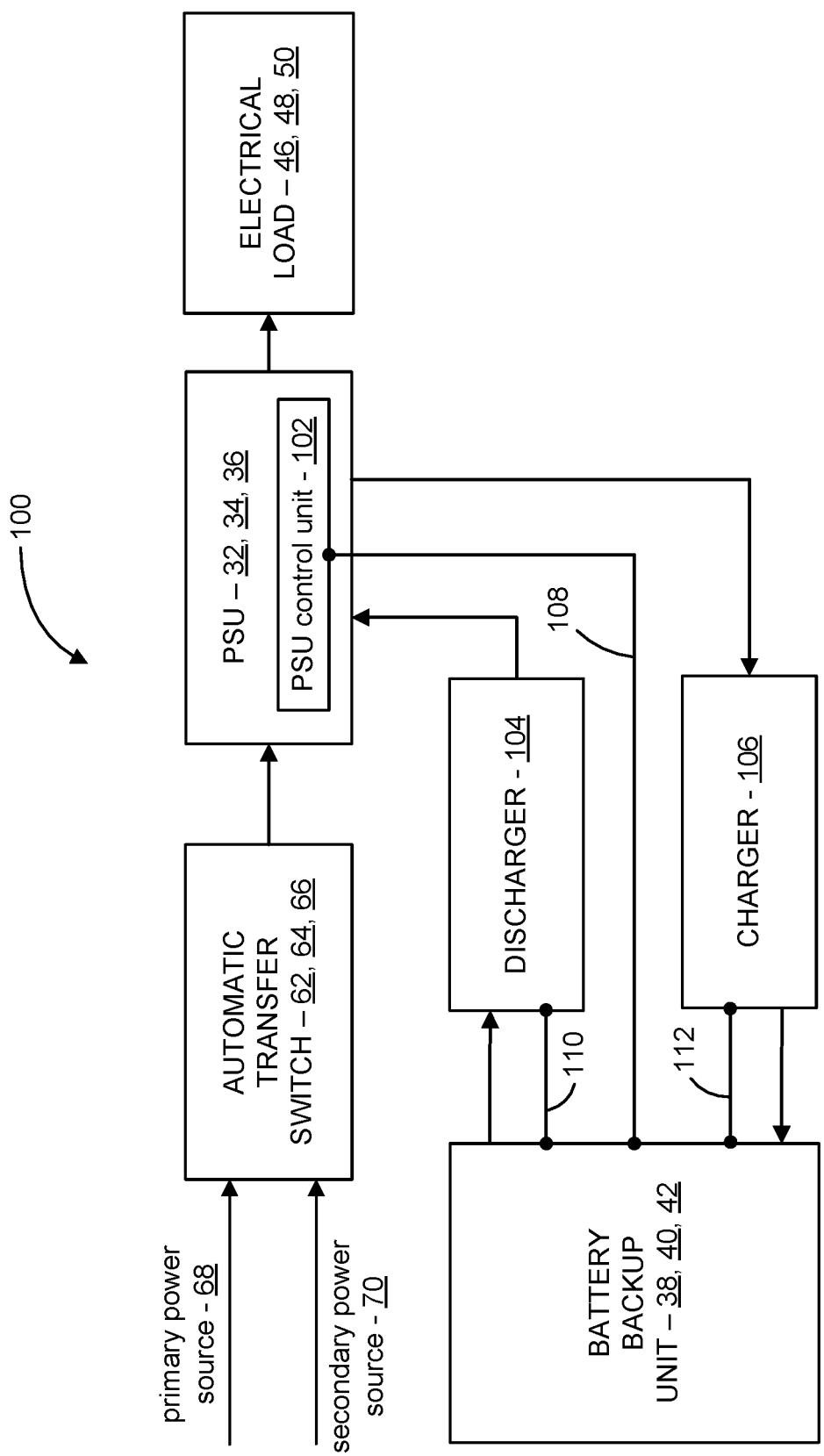
FIG. 8 is a simplified schematic representation of a power supply assembly, in accordance with various embodiments.

FIG. 8 is a simplified schematic representation of a power supply assembly 100 that can be used in the power supply system 60. The power supply assembly 100 can be used in place of a respective one of the automatic transfer switches 62, 64, 66, an associated one of the power supply units 32, 34, 36, and an associated one of the battery backup units 38, 40, 42. In the illustrated embodiment, the power supply assembly 100 includes a power supply unit (PSU) control unit 102, a discharger 104, and a charger 106. The PSU control unit 102 controls the recharging of the battery backup unit 38, 40, 42 using a respective sequence of intermittent charging cycles per the method 10. The PSU control unit 102 can be communicatively connected with the BBU 38, 40, 42 via any suitable communication link, including any suitable wired or wireless communication link. For example, in the illustrated embodiment, the PSU control unit 102 is communicatively connected with the BBU 38, 40, 42 via a wired communication link 108. The BBU 38, 40, 42 can be communicatively connected with each of the discharger 104 and the charger 106 via any suitable communication link, including any suitable wired or wireless communication link. For example, in the illustrated embodiment, the BBU 38, 40, 42 is communicatively connected with the discharger 104 via a wired communication link 110. The BBU 38, 40, 42 is communicatively connected with the charger 106 via a wired communication link 112.

In some embodiments, the PSU control unit 102 controls charging and discharging of the BBU 38, 40, 42 via control signals transmitted to the BBU 38, 40, 42 over the wired communication link 108. For example, the control signals transmitted to the BBU 38, 40, 42 by the PSU control unit 102 can include an alternating sequence of a charging enable signal and a charging disable signal. In response to receiving the charging enable signal, the BBU 38, 40, 42 can transmit a corresponding control signal over the communication link 112 to the charger 106 that causes the charger 106 to charge the BBU 38, 40, 42 using electrical power received from the PSU 32, 34, 36. In response to receiving the charging disable signal, the BBU 38, 40, 42 can transmit a corresponding control signal over the communication link 112 to the charger 106 that causes the charger 106 to not charge the BBU 38, 40, 42. The control signals transmitted to the BBU 38, 40, 42 by the PSU control unit 102 can include a discharge enable signal. In response to receiving the discharge enable signal, the BBU 38, 40, 42 can transmit a corresponding control signal over the communication link 110 to the discharger 104 that causes the discharger 104 to discharge the BBU 38, 40, 42 to supply electrical power to the PSU 32, 34, 36.

The specification and drawings are to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Various embodiments of this disclosure are described herein, including the best mode known to the inventors for carrying out the disclosure. Variations of those embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

What is claimed is:

1. A power supply system comprising:
    battery backup units (BBUs);
    power supply units, each of the power supply units being configured to output DC electrical power, wherein the output DC power is supplied to the power supply unit by a respective one of the BBUs or produced by the power supply unit using AC electrical power received by the power supply unit; and
    one or more control units configured to control recharging of the BBUs using respective sequences of charging segments and non-charging segments such that at least one of the BBUs is not charging while another of the BBUs is charging.

2. A method, comprising:
    discharging first and second battery backup units (BBUs) to supply electrical power to an electrical load;
    receiving, by one or more power supply units, an input electrical power;
    using a first portion of the input electrical power, by the one or more power supply units, to supply electrical power to the electrical load;
    using a second portion of the input electrical power, by the one or more power supply units, to supply electrical power to recharge the first and second BBUs; and
    independently controlling recharging of each of the first and second BBUs by using a respective sequence of charging segments and non-charging segments so that at least one of the charging segments for the first battery backup unit overlaps one of the non-charging segments of the second battery backup unit.

3. The method of claim 2, comprising transmitting a respective charging control signal to each of the first and second battery backup units, each of the respective charging control signals comprising an alternating sequence of a charging enable signal and a charging disable signal, the charging enable signal causing the respective battery backup unit to recharge during each of the respective charging segments, and the charging disable signal causing the respective battery backup unit to not recharge during each of the respective non-charging segments.

4. The method of claim 2, wherein:
 each of the sequences of charging segments and non-charging segments alternate between a charging segment and a non-charging segment; and
 the charging segments or the non-charging segments have varying time spans.

5. The method of claim 4, wherein each of the sequences of charging segments and non-charging segments has an initial charging segment having a time span that is randomly determined.

6. The method of claim 2, wherein:
 each of the respective sequences of charging segments and non-charging segments employs either a first charge order in which each charging segment precedes an associated non-charging segment or employs a second charge order in which each non-charging segment precedes an associated charging segment;
 one of the respective sequences of charging segments and non-charging segments employs the first charge order; and
 another of the respective sequences of charging segments and non-charging segments employs the second charge order.

7. The method of claim 6, wherein one or more control units randomly select which of the first charge order and the second charge order to employ for recharging of at least one of the battery backup units.

8. The method of claim 2, wherein each respective charging segment has a charging segment time span that is equal to a duty cycle percentage of a time span of a combination of the charging segment and an adjacent one of the non-charging segments.

9. The method of claim 8, wherein the duty cycle percentage is based on a magnitude of a charging current supplied to the respective battery backup unit.

10. The method of claim 2, wherein one of the respective sequences of charging segments and non-charging segments begins after a delay period from when the input electrical power begins to be supplied to the one or more power supply units.

11. A computer readable medium storing non-transitory instructions executable by one or more control units to:
 discharge of first and second battery backup units (BBUs) to supply electrical power to an electrical load;
 use a first portion of an input electrical power to supply electrical power to the electrical load;
 use a second portion of the input electrical power to supply electrical power to recharge the first and second BBUs; and
 independently control recharging of each of the first and second BBUs by using a respective sequence of charging segments and non-charging segments so that at least one of the charging segments for the first battery backup unit overlaps one of the non-charging segments of the second battery backup unit.

12. A power supply system comprising:
 a first battery backup unit (BBU);
 a first power supply unit (PSU) comprising a first PSU control unit, wherein the first PSU is configured to use electrical power received from a main power source to supply electrical power to a first electrical load, wherein the first PSU is further configured to use electrical power received from the first BBU to supply electrical power to the first electrical load when not supplied electrical power by the main power source, wherein the first PSU control unit controls recharging of the first BBU using a sequence of first sequence charging segments and first sequence non-charging segments, and wherein the first PSU uses electrical power received from the main power source to supply electrical power to the first BBU for recharging of the first BBU during each of the first sequence charging segments, and wherein the first BBU is not recharged during each of the first sequence non-charging segments;
 a second BBU; and
 a second PSU comprising a second PSU control unit, wherein the second PSU is configured to use electrical power received from the main power source to supply electrical power to a second electrical load, wherein the second PSU is further configured to use electrical power received from the second BBU to supply electrical power to the second electrical load when not supplied electrical power by the main power source, wherein the second PSU control unit controls recharging of the second BBU using a second sequence of second sequence charging segments and second sequence non-charging segments, and wherein the second PSU uses electrical power received from the main power source to supply electrical power to the second BBU for recharging of the second BBU during each of the sequence charging segments, and wherein the second BBU is not recharged during each of the second sequence non-charging segments,
 wherein at least one of the first sequence charging segments overlaps at least one of the second sequence non-charging segments.

* * * * *